(12) United States Patent
Rathinasamy et al.

(10) Patent No.: US 11,677,471 B2
(45) Date of Patent: Jun. 13, 2023

(54) HYBRID CABLE FOR OPTIC AND COPPER PORT CONNECTIVITY

(71) Applicant: Dell Products L.P., Round Rock, TX (US)

(72) Inventors: Shree Rathinasamy, Round Rock, TX (US); Neal Beard, Austin, TX (US); Kannan Karuppiah, Freemont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/341,010

(22) Filed: Jun. 7, 2021

(65) Prior Publication Data
US 2022/0393766 A1 Dec. 8, 2022

(51) Int. Cl.
*H04B 10/40* (2013.01)
*H04B 10/25* (2013.01)

(52) U.S. Cl.
CPC ............ *H04B 10/40* (2013.01); *H04B 10/25* (2013.01)

(58) Field of Classification Search
CPC ................................. H04B 10/25; H04B 10/40
USPC ......................................................... 398/116
See application file for complete search history.

(56) References Cited

U.S. PATENT DOCUMENTS

| | | | |
|---|---|---|---|
| 2002/0126967 A1* | 9/2002 | Panak | H04L 5/16 385/101 |
| 2006/0088251 A1* | 4/2006 | Wang | G02B 6/4201 385/101 |
| 2007/0237470 A1* | 10/2007 | Aronson | G02B 6/4249 385/100 |
| 2012/0249871 A1* | 10/2012 | Nguyen | H04N 7/102 348/E7.003 |
| 2021/0325616 A1* | 10/2021 | Lands | G02B 6/4269 |

* cited by examiner

*Primary Examiner* — Dalzid E Singh
(74) *Attorney, Agent, or Firm* — Jackson Walker L.L.P.

(57) ABSTRACT

A cable assembly may include a cable having a plurality of electrically-conductive wires and an optical port termination at a first end of the cable for terminating the plurality of electrically-conductive wires and configured to electrically couple to an optical network port integral to an information handling system and configured to receive an optical transceiver module.

10 Claims, 2 Drawing Sheets

HYBRID CABLE FOR OPTIC AND COPPER PORT CONNECTIVITY

TECHNICAL FIELD

The present disclosure relates in general to information handling systems, and more particularly to systems and methods for providing a mechanical cable release in a transceiver, such as a cable associated with an optical transceiver module.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems may have a network interface or other input/output (I/O) interface configured to receive an optical transceiver module (e.g., a small form-factor pluggable (SFP) transceiver or a quad small form-factor pluggable (QSFP) transceiver of any I/O speed). Such transceiver modules often plug into "cages" disposed on an I/O interface card, which often reside in the rear of the information handling system.

Other information handling systems may have a network interface or other input/output (I/O) interface configured to receive an electrical connector (e.g., an 8 position 8 contact (8P8C) connector) for an electrical cable (e.g., a Category 5 or Category 6 cable).

In some instances it may be desirable to communicatively couple a first information handling system having an optical network interface (but not an electrical network interface) to a second information handling system having an electrical network interface (but not an optical network interface). However, existing approaches to networked communication may not effectively allow such connectivity.

SUMMARY

In accordance with the teachings of the present disclosure, the disadvantages and problems associated with traditional approaches to networked connectivity may be reduced or eliminated.

In accordance with embodiments of the present disclosure, a cable assembly may include a cable having a plurality of electrically-conductive wires and an optical port termination at a first end of the cable for terminating the plurality of electrically-conductive wires and configured to electrically couple to an optical network port integral to an information handling system and configured to receive an optical transceiver module.

In accordance with these and other embodiments of the present disclosure, a method for fabricating a cable assembly may include at a first end of a cable having a plurality of electrically-conductive wires, terminating the cable with an optical port termination configured to electrically couple to an optical network port integral to an information handling system and configured to receive an optical transceiver module.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
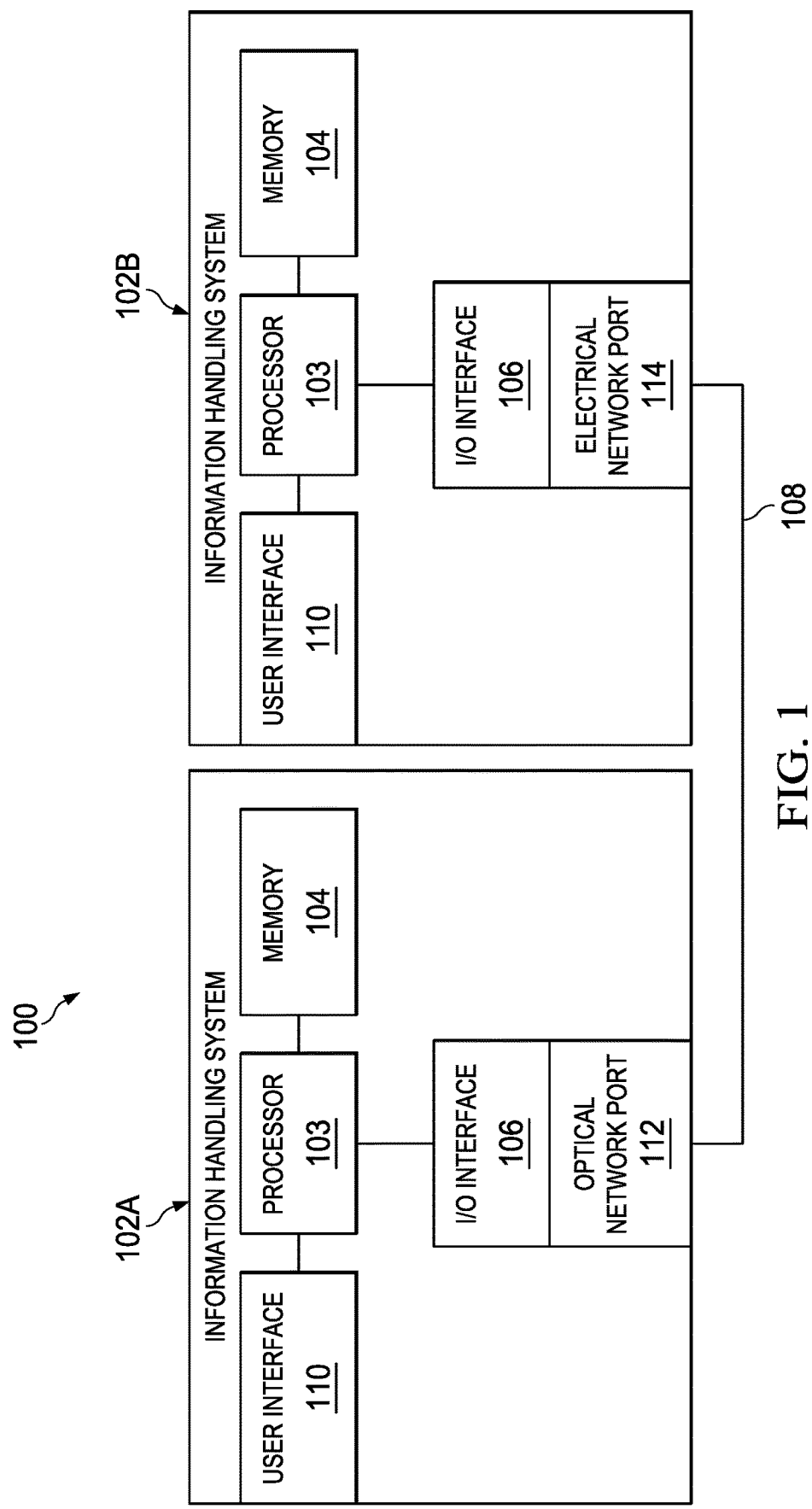
FIG. 1 illustrates a block diagram of selected components of an example system of two networked information handling systems, in accordance with embodiments of the present disclosure.
Figure 2:
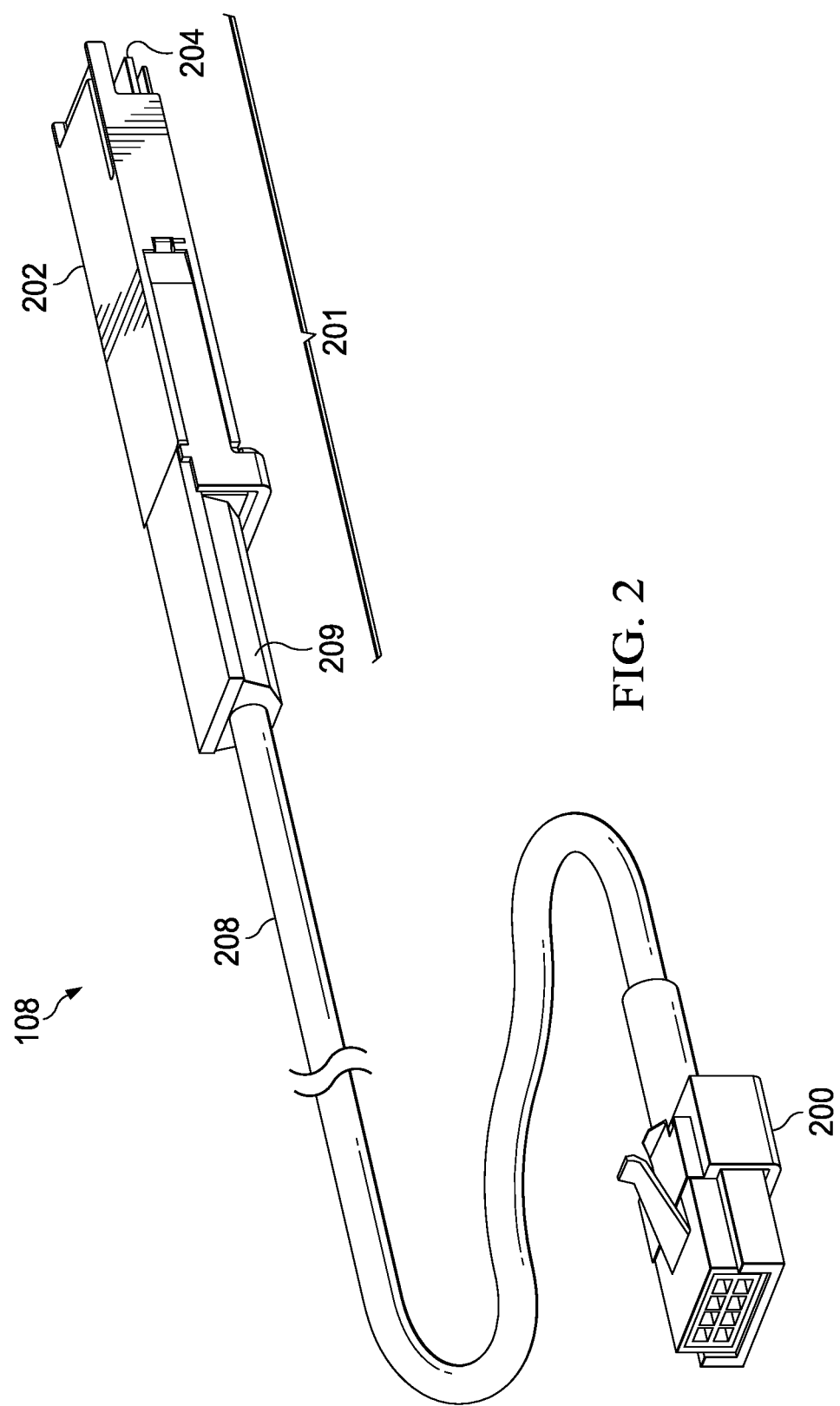
FIG. 2 illustrates a perspective view of an example hybrid cable, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of selected components of an example system 100 of two networked information handling systems 102 (e.g., information handling system 102A and information handling system 102B), communicatively coupled to one another via a hybrid cable assembly 108, in accordance with embodiments of the present disclosure. In some embodiments, one or both of information handling systems 102 may be a personal computer (e.g., a desktop computer or a portable computer). In other embodiments, one or both of information handling systems 102 may comprise a storage server for archiving data. In yet other embodiments, one or both of information handling systems 102 may comprise a server. In further embodiments, one or both of information handling systems 102 may comprise a network switch.

As depicted in FIG. 1, information handling system 102A may include a processor 103, a memory 104 communicatively coupled to processor 103, an input/output (I/O) interface 106 communicatively coupled to processor 103, a user interface 110 communicatively coupled to processor 103, and an optical network port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102A is turned off.

I/O interface 106 may comprise any suitable system, apparatus, or device operable to serve as an interface between information handling system 102A and one or more other external devices. For example, in some embodiments, I/O interface 106 may comprise a network interface configured to serve as an interface between information handling system 102A and other information handling systems via a network, in which case I/O interface 106 may comprise a network interface card, or "NIC."

User interface 110 may comprise any instrumentality or aggregation of instrumentalities by which a user may interact with information handling system 102A. For example, user interface 110 may permit a user to input data and/or instructions into information handling system 102A, and/or otherwise manipulate information handling system 102A and its associated components. User interface 110 may also permit information handling system 102A to communicate data to a user, e.g., by way of a display device.

Optical network port 112 may comprise an electrical connector in the form of any suitable combination of a jack, a socket, and/or a "cage" for receiving a corresponding connector of an optical transceiver module. Such an optical transceiver module may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such equivalent optical signal as an outgoing optical signal (e.g., via an optical cable, which may be integral to the same assembly as the optical transceiver module). An optical transceiver module may include an SFP transceiver, a QSFP transceiver, or any other suitable form factor.

In addition to processor 103, memory 104, I/O interface 106, user interface 110, and optical network port 112, information handling system 102A may include one or more other information handling resources. Such an information handling resource may include any component system, device, or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

As depicted in FIG. 1, information handling system 102B may be similar in many respects to information handling system 102A, except that information handling system 102B may include an electrical network port 114 in lieu of optical network port 112. Electrical network port 114 may comprise an electrical connector in the form of any suitable combination of a jack, a socket, and/or a "cage" for receiving a corresponding connector (e.g., an 8 position 8 contact (8P8C) cable termination) of a cable (e.g., a Category 5 or a Category 6 cable).

In addition to processor 103, memory 104, I/O interface 106, user interface 110, and electrical network port 114, information handling system 102B may include one or more other information handling resources. Such an information handling resource may include any component system, device, or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Hybrid cable assembly 108 may comprise any system, device, or apparatus configured to provide connectivity between optical network port 112 and electrical network port 114, as described in greater detail below. FIG. 2 illustrates a perspective view of an example hybrid cable assembly 108, in accordance with embodiments of the present disclosure.

As shown in FIG. 2, hybrid cable assembly 108 may include a cable 208 terminated at one end with an electrical connector 200 and terminated at its other end with an optical port termination 201. Cable 208 may comprise a plurality of electrically-conductive wires running side by side or bundled together, each of which is capable of carrying electric current. For example, in some embodiments, cable 208 may comprise a Category 5 or a Category 6 cable which includes four twisted pairs of wires (e.g., eight total wires).

As mentioned above, cable 208 may be terminated at one end of cable 208 with electrical connector 200. Electrical connector 200 may comprise any suitable system, device, or apparatus configured to electrically terminate wires of cable 208, mechanically couple to a corresponding electrical connector (e.g., electrical network port 114), and electrically couple the wires of cable 208 to the corresponding electrical connector. For example, in some embodiments, electrical connector 200 may comprise an 8P8C connector, which is sometimes referred to as an RJ-45 connector.

Also as mentioned above, cable 208 may be terminated at its other end with optical port termination 201. Optical port termination 201 may comprise any suitable system, device, or apparatus configured to electrically terminate wires of cable 208, mechanically couple to a corresponding optical port connector (e.g., optical network port 112), and electrically couple the wires of cable 208 to the corresponding optical port connector. Accordingly, optical port termination 201 may be in a form factor capable of mechanically and optically coupling to such an optical port connector, for example a SFP or QSFP form factor.

As shown in FIG. 2, optical port termination 201 may include a housing 202 for housing a transceiver 204 and one or more other components and a strain relief feature 209. Housing 202 may comprise a metal enclosure configured to house and/or provide mechanical structure for transceiver 204, including mechanical features (e.g., guiding features) for aligning and/or mechanically securing transceiver 204 to I/O interface 106 via optical network port 112.

Transceiver 204 may include any system, device, or apparatus configured to receive an incoming electrical signal (e.g., via cable 208), convert the incoming electrical signal into an equivalent electrical signal, and communicate such equivalent electrical signal to I/O interface 106 (e.g., via optical network port 112), and also configured to receive an electrical signal from I/O interface 106 (e.g., via optical network port 112), convert such electrical signal into an equivalent electrical signal, and communicate such equivalent optical signal as an outgoing optical signal (e.g., via cable 208).

In particular, transceiver 204 may be present in optical port termination 201 in lieu of an optical transceiver that would typically be present within an optical transceiver module. Thus, instead of converting between optical signals and electrical signals, and vice versa, transceiver 204 may be configured to convert between electrical signals having a standard associated with optical network port 112 and electrical signals having a standard associated with electrical network port 114. Thus, while optical port termination 201 uses the term "optical," optical port termination 201 may in fact not include any optical transmission or reception components.

Strain relief feature 209 may mechanically enclose cable 208 and may be formed from any suitable material that may be configured to provide strain relief to cable 208 while also providing support to the extension of housing 202.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A cable assembly, comprising:
   a cable having a plurality of electrically-conductive wires;
   an optical port termination at a first end of the cable for terminating a first end of the plurality of electrically-conductive wires and configured to electrically couple to an optical network port integral to an information handling system and configured to receive an optical transceiver module; and
   an electrical connector at a second end of the cable for terminating a second end of the plurality of electrically conductive wires and configured to electrically couple to an electrical network port;
   wherein the optical port termination includes a transceiver to convert between first electrical signals, having a standard associated with the optical network port, and second electrical signals, having a standard associated with the electrical network port wherein the transceiver lacks optical transmission components.

2. The cable assembly of claim 1, wherein the optical port termination is in a form factor of an optical transceiver module form factor for which the optical network port is configured to receive.

3. The cable assembly of claim 2, wherein the optical port termination is in a small form-factor pluggable form factor.

4. The cable assembly of claim 2, wherein the optical port termination is in a quad small form-factor pluggable form factor.

5. The cable assembly of claim 1, wherein the electrical network port comprises an electrical network port integral to a second information handling system.

6. A method for fabricating a cable assembly comprising:
   at a first end of a cable having a plurality of electrically-conductive wires, terminating first ends of the plurality of electrically conductive wires with an optical port termination configured to electrically couple to an optical network port integral to an information handling system and configured to receive an optical transceiver module
   at a second end of the cable, terminating second ends of the plurality of electrically conductive wires with an electrical connector configured to electrically couple to an electrical network port;
   wherein the optical port termination includes a transceiver to convert between first electrical signals, having a standard associated with the optical network port, and second electrical signals, having a standard associated with the electrical network port wherein the transceiver lacks optical transmission components.

7. The method of claim 6, wherein the optical port termination is in a form factor of an optical transceiver module form factor for which the optical network port is configured to receive.

8. The method of claim 7, wherein the optical port termination is in a small form-factor pluggable form factor.

9. The method of claim 7, wherein the optical port termination is in a quad small form-factor pluggable form factor.

10. The method of claim 6, wherein the electrical connector is configured to electrically couple to an electrical network port integral to a second information handling system.

* * * * *